US010592790B1

(12) United States Patent
Mao et al.

(10) Patent No.: US 10,592,790 B1
(45) Date of Patent: Mar. 17, 2020

(54) PARALLEL IMAGE PROCESSES

(71) Applicant: Hewlett-Packard Development Company, L.P., Houston, TX (US)

(72) Inventors: Yafei Mao, West Lafayette, IN (US); Jan Allebach, West Lafayette, IN (US); Lluis Abello Rosello, Sant Cugat del Valles (ES); Joan Vidal Fortia, Sant Cugat del Valles (ES); Robert Ulichney, Stow, MA (US); Utpal Kumar Sarkar, Sant Cugat del Valles (ES)

(73) Assignees: Hewlett-Packard Development Company, L.P., Spring, TX (US); Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 16/183,904

(22) Filed: Nov. 8, 2018

(51) Int. Cl.
*G06K 15/02* (2006.01)
*H04N 1/405* (2006.01)

(52) U.S. Cl.
CPC ..... *G06K 15/1881* (2013.01); *G06K 15/1857* (2013.01); *H04N 1/4052* (2013.01)

(58) Field of Classification Search
CPC .......... G06K 15/1881; G06K 15/1857; H04N 1/4052
See application file for complete search history.

(56) References Cited

U.S. PATENT DOCUMENTS

| 5,519,791 A | 5/1996 | Webb |
| 5,553,165 A | 9/1996 | Webb et al. |
| 6,307,978 B1 | 10/2001 | Metaxas |
| 7,480,078 B2 | 1/2009 | Choi et al. |
| 8,681,381 B1 | 3/2014 | Keithley et al. |
| 9,083,912 B2 | 7/2015 | Li |
| 2004/0008382 A1 | 1/2004 | Barbalet |
| 2005/0094211 A1 | 5/2005 | Dang |

*Primary Examiner* — Christopher Wait
(74) *Attorney, Agent, or Firm* — Brooks Cameron & Huebsch PLLC (57) ABSTRACT

In some examples, an imaging device may include a controller including processing circuitry to detect, a first quantity of rows of pixels to be included as a first band of a contone image, process the pixels of each row of the first band in parallel raster order, detect a second quantity of rows of pixels to be included as a second band of the contone image; and process the pixels of each row of the second band in response to the completion of the pixels of the first band, where the rows of the second band are processed in parallel in serpentine order with respect to the first band.

15 Claims, 5 Drawing Sheets

PARALLEL IMAGE PROCESSES

BACKGROUND

Imaging devices, such as printers and scanners, may be used for transferring print data on to a medium, such as paper. The print data may include, for example, a picture or text or a combination thereof and may be received from a computing device. The imaging device may generate an image by processing pixels each representing an assigned tone to create a halftone image.

DETAILED DESCRIPTION

Imaging devices may generate an image by processing pixels each representing an assigned tone. As used herein, "pixel" refers to the programmable unit of print substance (e.g., ink, toner, etc.) to be deposited on a print medium (e.g., paper). An image may be spatially represented as a 2-dimensional array of pixels. The pixels making up an image may have different contone values. As used herein, the term "contone value" refers to a tone, size, and/or density of the pixel. For example, the tone of a pixel may refer to the intensity, color, etc. to be deposited by the imaging device at the location of a particular pixel. For example, when multiple pixels include a range of possible contone values such that a human visual system perceives it as continuous, the resulting image is a contone image. An imaging device may produce a limited number of tones, so a contone image may not be produced as is represented by the pixels. As such, the contone values of the pixels of the input image may be converted to an image with a limited number of tones such that an imaging device may generate the image utilizing print media. The process of converting a contone image to an image with a limited number of tones is called halftoning, and the resulting image is a halftone image.

An imaging device may include a controller including processing circuitry such as Field Programmable Gate Array (FPGA) and/or Application Specific Integrated Circuit (ASIC), to perform the operations of halftoning processing. For example, the controller, via the processing circuitry may determine the contone value of each pixel in the contone image. In some examples, the imaging device may include a sensor to sense the contone value of each pixel in the contone image. Examples of sensors include infrared (IR) sensors and optical sensors, among other suitable sensors to sense a contone value of multiple pixels in a contone image.

Halftoning processing implemented in imaging devices may utilize error diffusion processing to produce quality images. An example of an error diffusion processing is Tone Dependent Fast Error Diffusion (TDFED) which is a variation of the Floyd-Steinberg model. TDFED diffuses an amount of error of an input pixel to multiple neighboring pixels that are unprocessed, and the error diffused to the unprocessed pixel updates the target contone value of the unprocessed pixel. As used herein, the term "processed" and/or "processed pixel" refers to an imaging device determining a halftone value of a pixel. For example, during processing, an imaging device may apply TDFED to a pixel (e.g., the contone value of the pixel) to determine a halftone value. As used herein, the term "unprocessed pixel" refers to a pixel that does not yet have a halftone value assigned to it. A halftone value is a value assigned to a pixel that determines the whether the imaging device may deposit a print substance mark for that pixel. The halftone value may be determined by the contone value of the pixel and any error that has been diffused to that pixel. In this way, TDFED produces quality halftone images. As used herein, the term "quality halftone image" refers to a halftone image that is devoid of multiple artifacts, imperfections, blurs, or other printing anomalies/errors which may be determined as undesirable by the human visual system.

During the execution of TDFED, the pixels are processed in a fixed serpentine order. As used herein, the term "serpentine" refers to alternatively iterating the rows of pixels from left to right and right to left. For example, TDFED may alternate the rows of pixels e.g., a first row is processed from left to right and a second row may be processed from right to left.

The unprocessed pixel destinations to which error from an input pixel may be diffused may be determined from a look-up table stored on an imaging device. For example, the imaging device may include a look-up table where contone values are stored and correspond to locations of unprocessed pixels included in the input image. For instance, the controller of the imaging device may determine a contone value of the pixel being processed and determine, based on the look-up table, the locations to diffuse the error from the input pixel. In this way, the locations of the unprocessed pixels may be selected for the diffusion of the error from TDFED. Though the process of halftoning described by TDFED produces quality halftone images, the throughput may not produce the quantity of print media in a given time period when compared to other methods.

As such, this disclosure is directed to parallel image processes utilizing TDFED and a four-row serpentine scan path. Parallel processing includes processing multiple rows of pixels concurrently. As used herein, the term "concurrently" refers to multiple rows of pixels being processed at the same time. For example, an imaging device may include multiple rows in multiple stages of processing, where the rows may be at different stages of processing at the same time. In other words, a contone image may be partitioned into bands, and the bands may each include multiple rows to be processed in parallel within each band. Because multiple rows are processed concurrently, the contone image may produce quality halftone images with an increased throughput than when compared to the fixed serpentine order. Specifically, a four-row serpentine scan path may increase throughput by four fold. For example, a band comprising four rows of pixels may be processed at the same time. As such, the throughput of an imaging device may be increased by four or other value as compared to other approaches that do not employ parallel imaging processes. That is, while four rows are discussed herein, implementations utilizing more, or less than four rows are contemplated as examples.

As mentioned, an imaging device may include a controller including processing circuitry. The controller may detect a first quantity of rows of pixels to be included as a first band. As used herein, the term "band" refers to rows of pixels, and/or columns of pixels. The controller may process each row of the first band in parallel raster order. As used herein, the term "raster" refers to a processing order where the pixels are processed in a same direction. For example, a first row of pixels of a band may be processed in raster order from left to right and a second row may be processed in raster order from left to right. As used herein, "parallel raster" order refers to multiple rows of pixels processed concurrently in a raster order. For example, the first and the second rows of pixels may be processed concurrently from left to right. To achieve a four-row serpentine scan path, the controller may detect a second quantity of rows of pixels to be included as a second band of the contone image and process the pixels of each row of the second band in response to the completion of the pixels of the first band. In this instance, the rows of the second band are processed in parallel raster order from right to left. In other words, the second band is processed in serpentine order with respect to the first band. Notably, during the four-row serpentine scan path described herein, error diffusion of each pixel being processed is diffused to unprocessed pixel locations during the parallel processing of the bands such that image quality may be achieved while increasing throughput.

Figure 1:
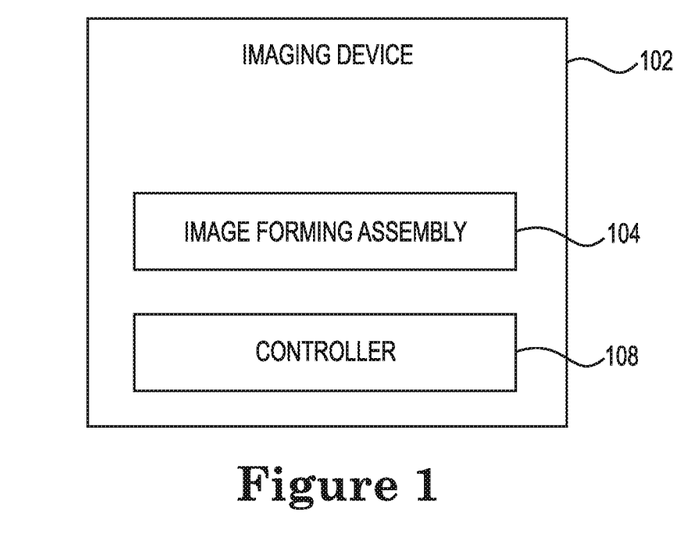
FIG. 1 illustrates a schematic of an imaging device for parallel image processes according to an example.

FIG. 1 illustrates a schematic of an imaging device for parallel image processes according to an example. As illustrated in FIG. 1, the imaging device 102 may include an image forming assembly 104, and a controller 108. Examples of an imaging device 102 include, but are not limited to, printers, scanners, copiers, fax machines, and the like. As mentioned, the imaging device 102 may recreate digital content, such as text, images, and/or pictures, on a print media by transferring print substance onto print media.

The imaging device 102 may include a controller 108 to detect an array of pixels for an image to be generated by the imaging device 102. For example, the controller 108 may detect a contone value for a pixel and/or multiple pixels making up an image. The imaging device 102 may include a body portion (not illustrated) to house various components of the imaging device 102. The imaging device 102 may include the image forming assembly 104. The image forming assembly 104 may be a printhead, among other types of image forming assemblies. The image forming assembly 104 may deposit an amount of print substance at a pixel based on the contone value sensed by the controller 108 to form an image.

The imaging device 102 may include the controller 108. Although not illustrated in FIG. 1 as to not obscure examples of the disclosure, the controller 108 may include processing circuitry. In some examples, the processing circuitry may include hardware circuitry such a FPGA and/or an ASIC. In other words, the controller 108 may include dedicated logic (e.g., ASIC and/or FPGA) which may be configured to perform the operations of the parallel image processes described in examples herein. In some examples, the controller 108 may include a processing circuitry such as a processing resource and a machine-readable storage medium. Although the following descriptions refer to an individual processing resource and an individual machine-readable storage medium, the descriptions may also apply to a system with multiple processing resources and multiple machine-readable storage mediums. In such examples, the instructions may be distributed across multiple machine-readable storage mediums and the instructions may be distributed across multiple processing resources. Put another way, the instructions may be stored across multiple machine-readable storage mediums and executed across multiple processing resources, such as in a distributed computing environment.

A processing resource may be a central processing unit (CPU), microprocessor, and/or other hardware device suitable for retrieval and execution of instructions stored in a machine-readable storage medium. As an alternative or in addition to retrieving and executing instructions, processing resource may include the electronic circuit comprising an electronic component for performing the operations of the instructions in machine-readable storage medium (e.g., an ASIC and/or FPGA).

A machine-readable storage medium may be any electronic, magnetic, optical, or other physical storage device that stores executable instructions. Thus, machine-readable storage medium may be, for example, Random Access Memory (RAM), an Electrically-Erasable Programmable Read-Only Memory (EEPROM), a storage drive, an optical disc, and the like. The executable instructions may be "installed" on the controller 108 illustrated in FIG. 1. A machine-readable storage medium may be a portable, external or remote storage medium, for example, that allows the controller 108 to download the instructions from the portable/external/remote storage medium.

As mentioned, TDFED may be applied to parallel image processes as described in examples herein. When TDFED is applied to the contone value of an input pixel, an amount of error may be determined. For example, a controller 108 may determine a contone value of an input pixel at a location of a pixel array. The error calculated from TDFED may be diffused to a quantity (e.g., four) neighboring unprocessed pixels. As used herein, the term "neighbor" refers to a processed or unprocessed pixel location. In some examples, the neighbor may be in a different band than the input pixel being processed. For example, the neighboring location may be directly adjacent to the pixel being processed, adjacent to an immediate neighbor of the pixel currently being processed, and/or another unprocessed pixel location within the pixel array. For example, an immediate neighbor includes a pixel location that is directly above, below, to the left, to the right, or diagonal to the pixel being processed. In response to receiving the diffused error from the input pixel, each unprocessed pixel location may update the contone value of the unprocessed pixel location, where the updated value may be used to determine a halftone value.

The locations of the unprocessed pixels to which the error from an input pixel may be diffused may be predetermined and stored in a look-up table of contone values corresponding to error distribution locations. For example, the imaging device 102 may store the look-up table which may include multiple contone values. The look-up table may store each possible contone value for a given input image. Each contone value may correspond to a set of unprocessed pixel locations to diffuse error when a pixel is processed using TDFED.

The error from the input pixel may be diffused into proportions that may also be contained in the stored table. As used herein, the proportions of the diffused error may be referred to as weights. For example, if the contone value for a given input pixel is 100, the controller 108 may access a predetermined look-up table to determine that the weights of the error to be diffused from the input pixel are distributed across four unprocessed pixel locations (e.g., 25% of the error across four locations). The error may be distributed in different combinations having a combined sum of one (e.g., 100%). For example, for an input pixel having a contone value of 200, the error may be distributed to a first unprocessed pixel location with a weight of 20%, a second unprocessed pixel location with a weight of 20%, a third unprocessed pixel location with a weight of 25%, and a fourth unprocessed pixel location with a weight of 35%. Thus, the unprocessed pixel locations may correspond to a set of weights (e.g., proportions) determined for each contone value. In other words, the unprocessed pixel locations are selected corresponding to the contone value of the input pixel.

In this way, the diffused error received by an unprocessed pixel may adjust the contone value of the unprocessed pixel when the unprocessed pixel is processed. Below is an example of a predetermined table.

TABLE 1

| Contone Value | Weight 1 | Weight 2 | Weight 3 | Weight 4 | Location 1 | Location 2 | Location 3 | Location 4 |
|---|---|---|---|---|---|---|---|---|
| 0 | W1 | W2 | W3 | W4 | Row 4, Column L | Row 4, Column K | Row 5, Column H | Row 5, Column F |
| 1 | W5 | W6 | W7 | W8 | Row 2, Column A | Row 3, Column B | Row 3, Column C | Row 3, Column D |
| ⋮ | | | | | | | | |
| 255 | W253 | W254 | W255 | W256 | Row 10, Column B | Row 11, Column B | Row 11, Column C | Row 11, Column E |

The locations, and the weights (e.g., proportions), corresponding to each contone value used in TDFED are predetermined outside of the imaging device through a training model. There are 256 possible contone values for a given pixel where the contone values range from 0-255, thus for each of the 256 contone values, the following information is stored in one of the 256 rows in the table: locations of the four unprocessed pixel locations to which the error is to be diffused, and the four weights indicating the proportion of the error that is to be diffused to these four pixels. The locations listed in Table 1 are example locations described by rows and columns, and other iterations of locations are contemplated (e.g., numbers, coordinates, etc.). In some examples, the controller 108 may determine utilize the look-up table (e.g., table 1) to achieve parallel image processes.

As mentioned, parallel image processes described herein may process a contone image in parallel at an increased throughput when compared to non-parallel processing. For instance, an input image may be partitioned into multiple bands comprising multiple rows. The rows of each band may be processed in parallel such that multiple rows of pixels may be processed concurrently. For example, the controller 108 may determine a first quantity of rows (e.g., 4) of pixels to be included as a first band of a contone image. The first quantity of rows may be processed concurrently in parallel. For example, the controller 108 may identify a contone value of an input pixel to be processed in a first row of the first band. The controller 108 may apply TDFED to the input pixel, which may produce error to be distributed to neighboring unprocessed pixels. The controller 108 may identify where the amount of error from the input pixel may be distributed based on a look-up table (e.g., the table 1) stored in the imaging device 102. Based on the information in the look-up table, the controller 108 may diffuse an amount of error of the input pixel to a plurality of unprocessed pixel locations, where each unprocessed pixel location is determined based on the contone value of the input pixel being processed. After the input pixel is processed, the next pixel in the row may be processed as described herein for the input pixel. To achieve parallel processing of each band of the contone image, the rows of the band are processed concurrently. Allowing error diffusion may increase the image quality during parallel image processes. To allow the error diffusion to unprocessed pixel locations, the controller 108 may implement a delay in advance of a second row of a band to begin processing. Said another way, the achievement of the parallel image processing of the multiple rows of the band may be achieved by implementing a delay in the initiation of each row of the multiple rows of the first band.

For example, the controller 108 may predetermine a delay and refer to a table. Below is an example of a table describing where weighted error may be diffused during a six pixel delay.

TABLE 2

| Pixel 1 | Pixel 2 | Pixel 3 | Pixel 4 | Pixel 5 | Pixel 6 | Input Pixel | W253 |
|---|---|---|---|---|---|---|---|
| W256 | | W255 | | W254 | | | |

Table 2 shows a grid of pixel locations included a six pixel delay. The controller 108 may determine that the input pixel has a contone value of 255, thus the error is diffused to the unprocessed pixel locations by weights W253, W254, W255, and W256. Because there is a predetermined six pixel delay, the controller 108 may process each of the pixels 1-6, and process the 7$^{th}$ pixel (e.g., the input pixel) and diffuse the error of the input pixel to the row below and six pixels behind (as denoted by table 2 W256). Thus, to achieve parallel images processes, the 8$^{th}$ pixel to be processed may be the pixel in the next row (six pixels behind) that had the W256 error diffused to it. In this way, the controller 108 may utilize look-up tables such as table 1 and table 2 to achieve parallel image processes with multiple rows and multiple bands.

For example, the controller 108 may process the pixels of each row of a first band in parallel raster order by implementing a delay in the processing of the pixels. The controller may include a table (e.g., table 2) to implement a delay of pixels that are more or less than six. Said differently, the controller 108 may have a predetermined delay of six pixels which may be referenced in a table (e.g., table 2). In an instance where the first band includes four rows, the first row may be processed pixel by pixel in raster order for pixels 1-7. The 8$^{th}$ pixel to be processed may be in the second row, and the first and second row may alternate pixel processing (now in a parallel raster order) until the second row reaches its 7th pixel, where the third row may begin its processing. This process may continue until the rows of the first band have completed their processing. In response to the completion of the first band, a second band may begin processing in serpentine order with respect to the first band.

For example, the controller 108 may detect a second quantity of rows (e.g., 4 rows) of pixels to be included as a second band of the contone image. In some examples, the controller 108 may determine the quantities of rows of the first band and the second band when the contone image is received by the imaging device 102 such that the quantity of rows of the first band and the quantity of rows of the second band may be equal (e.g., the first quantity and the second quantity are the same quantity). The processing of the second band of pixels may be processed in a parallel process similar to the first band. Specifically, the controller 108 may process the pixels of each row of the second band in response to the completion of the pixels of the first band such that the rows of the second band are processed in parallel in serpentine order with respect to the first band. This process is discussed in further detail in connection with FIG. 2. While specific numbers of, four unprocessed pixel locations, four weights, four rows, two bands, and six pixel delays are discussed herein, other examples are contemplated including more or less than the specific numbers mentioned by example.

Parallel image processes described herein include a four-row serpentine scan path utilizing TDFED. The controller 108 may set a delay (e.g., six pixel delay) such that multiple rows of pixels within a band may be processed concurrently while maintaining image quality. In response to the completion of a first band, a second band determined by the controller 108 may process its respective rows of pixels in serpentine order with respect to the first band. In this way, the described four-row serpentine scan path may increase throughput four fold. In combination with TDFED the increase in throughput may maintain a quality image quality.

Figure 2:
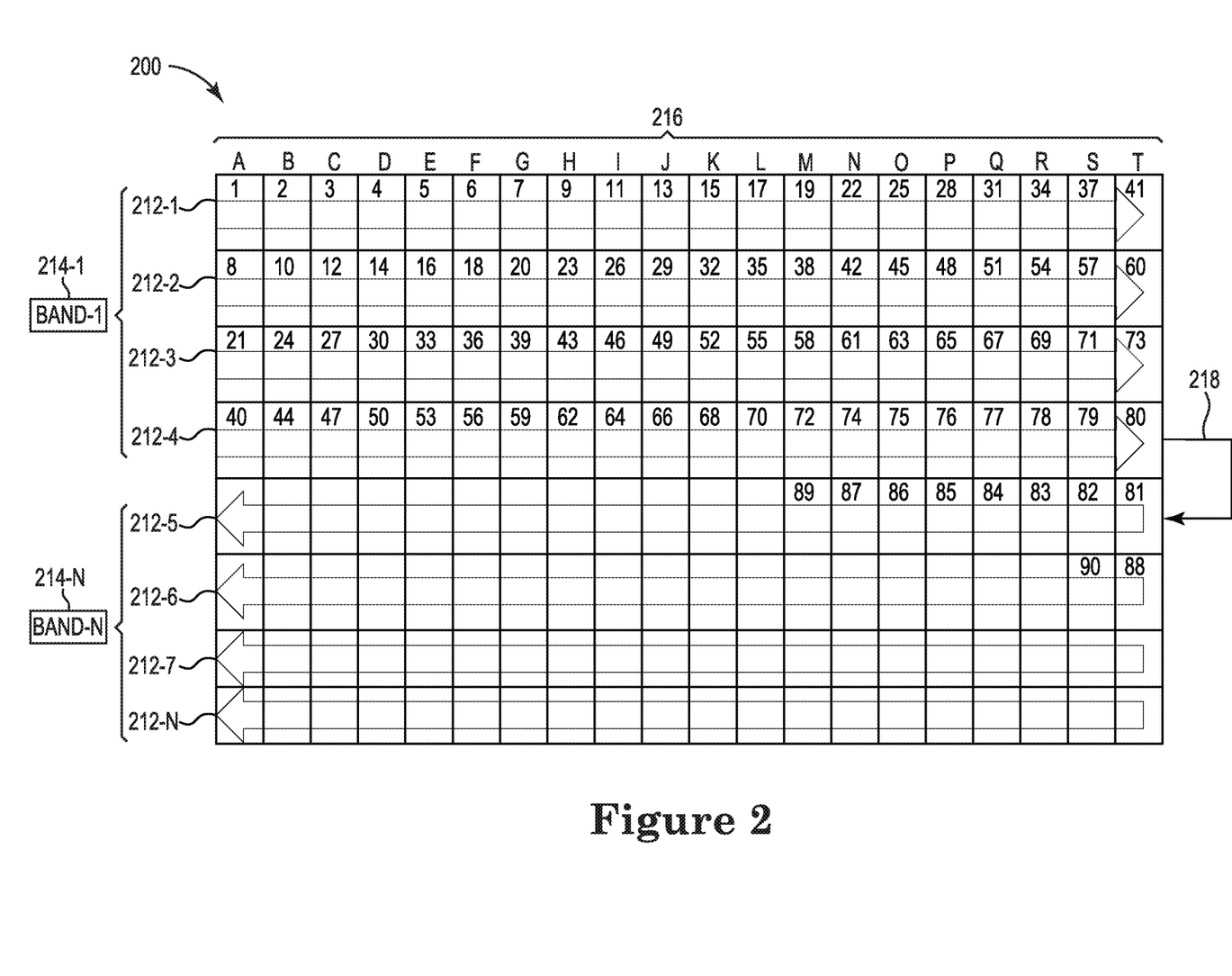
FIG. 2 illustrates a schematic of a parallel image processes of an input image according to an example.

FIG. 2 illustrates a schematic of a parallel image processes of an input image 200 according to an example. The input image 200 may be a contone image to be generated by an imaging device (e.g., the imaging device 102). FIG. 2 illustrates a schematic of an input image 200 including pixels which may be referenced herein in a grid orientation. For example, as referenced herein, a pixel may be referred to by coordinates of rows and columns. For example, FIG. 2 identified the input image 200 by rows 212-1, . . . , 212-N and columns 216 may be identified by alphabetic letters A-T. Thus, a pixel may be referred to herein by a coordinate of e.g., row 212-3 and column A denotes a pixel with the number 21, thus may be referred to herein as pixel 21, etc. As illustrated by FIG. 2, a pixel location that is absent a number represents an unprocessed pixel location e.g., Row 212-6 and column B is absent a number and is thus an unprocessed pixel location and may be referred to herein as the unprocessed pixel location at row 212-6 and column B, etc.

As illustrated by FIG. 2, a first band 214-1 and a second band 214-N including rows of pixels are identified. For example, the first band 214-1 may include rows 212-1, 212-2, 212-3, and 212-4 of pixels. The second band 214-N including rows 212-5, 212-6, 212-7, and 212-N. Thus, the quantity of rows of the first band 214-1 and the quantity of the second band 214-N are four, and thus equal. As mentioned, a controller (e.g., the controller 108) may set a delay in the pixel processing order such that the rows of each band may be processed in parallel raster order.

For example, the controller may set a delay of six pixels for the pixels of the first band 214-1 to be processed in parallel. In some examples, the controller may refer to a look-up table (e.g., table 2) for determining a processing order while setting a six pixel delay. For instance, the controller may determine a processing order of the pixels in the first band 214-1. The processing order may be understood by the following example of the first band 214-1. The first row 212-1 begins with an input pixel at 212-1 and column A, thus pixel 1. The controller (e.g., the controller 108) may determine the contone value of pixel 1, and process pixel 1 as described herein using TDFED. The error of pixel 1 may be diffused to neighboring pixels which is illustrated in greater detail in connection with FIG. 3. As denoted by the arrow of the row 212-1, the controller may process pixel 2 at row 212-1 and column 2. This process may continue in raster order of the first row 212-1 until the completion of pixel 7 at row 212-1 and column G.

As mentioned, the controller may set a delay, in this instance the delay is six pixels. Thus, pixel 7 at row 212-1 and column G may be processed, then the $8^{th}$ pixel may be processed and denoted as pixel 8 in the second row 212-2 and column A. The controller may alternate between processing pixels in the first row 212-1 and the second row 212-2 until the second row 212-2 has processed a $7^{th}$ pixel. The $7^{th}$ pixel of the second row 212-2 is pixel 20 at the second row 212-2 and column G. Because the controller has set a delay of 6, the $21^{st}$ pixel may be the first pixel of the third row 212-3. The controller may continue to process the pixels, now alternating between the three rows 212-1, 212-2, and, 212-3. When the first row 212-1 is completed at pixel 41, the controller may continue to process pixels alternating between the second row 212-2, the third row 212-3, and the fourth row 212-4 until the pixels of the first band 214-1 have been processed. In this way, the rows 212-1, 212-2, 212-3, and 212-4 of pixels of the first band 214-1 are processed in parallel raster order.

In response to the completion of the first band 214-1, the rows of pixels of the second band 214-1 may begin processing in serpentine order (indicated by the arrow 218) with respect to the first band 214-1. Specifically, the controller may determine a processing order of the pixels in the second band 214-N, and the controller may process the pixels in the second band 214-N in a serpentine order (denoted by the arrow 218) to the first band 214-1. As indicated by the arrows in the rows of the second band 214-1, the processing order of the pixels of the second band 214-N is from right to left (serpentine to the first band 214-1). The delay set by the controller may be applied to the second band 214-N.

For example, the first pixel processed in the second band 214-N is pixel 81 located at row 212-5 and column T. The controller may process the pixels in order as illustrated. The $7^{th}$ pixel is pixel 87 located at Row 212-5 and column N. Because the controller has set the delay at 6, the $8^{th}$ pixel may begin the processing of the second row 212-6 of the second band 214-N as pixel 88 at location row 212-6 and column T. Similar to the processing of the first band 214-1, the controller may alternate pixel processing between the first row 212-5 of the second band 214-N and the second row 212-6 of the second band 214-N and so on. This processing order may continue until the pixel at the unprocessed pixel location row 212-N column A is processed.

Parallel image processes as described herein and illustrated by FIG. 2 show a four-row serpentine scan path utilizing TDFED. The controller may set a delay such that multiple rows of pixels within a first band may be processed concurrently. In response to the completion of the first band, a second band determined by the controller may process its respective rows of pixels in serpentine order with respect to the first band. In FIG. 2 this is illustrated by the arrow 218. In this way, the described four-row serpentine scan path may increase throughput four fold. In combination with TDFED the increase in throughput may generate a quality image.

Figure 3:
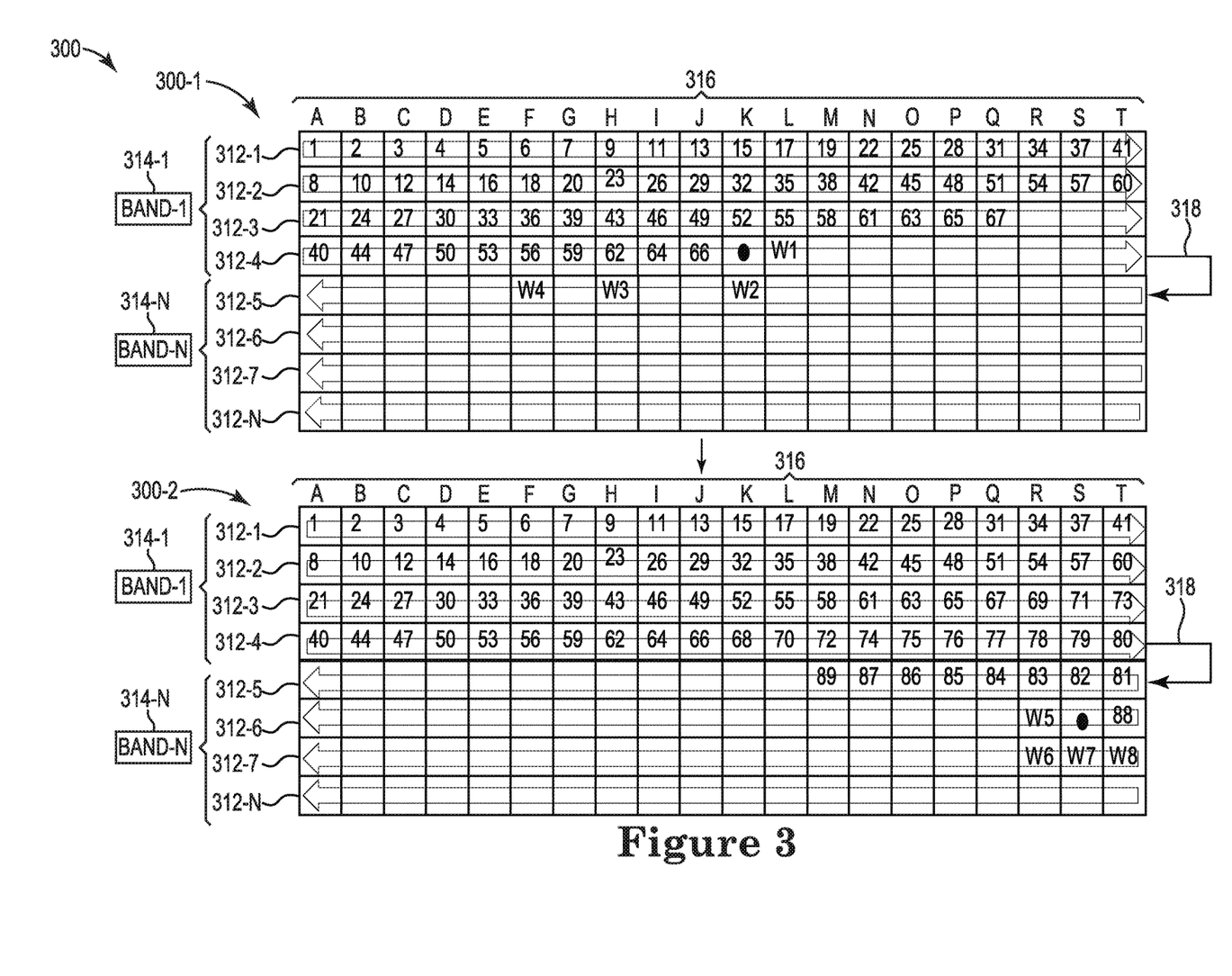
FIG. 3 illustrates another schematic parallel image processes of an input image according to an example.

FIG. 3 illustrates another schematic parallel image processes of an input image 300 according to an example. FIG. 3 illustrates an input image 300 (e.g., the input image 200 of FIG. 2) at two instances of parallel image processes. The first instance is denoted by FIG. 3 as input image 300-1 and the second instance is denoted as input image 300-2. For example, the input image 300-1 may be the input image 300 (e.g., a contone image) at a first discrete time in a parallel image processes, and input image 300-2 may be the input image 300 at a second discrete time in the parallel image processes.

The input image of FIG. 3 may be a contone image generated by an imaging device (e.g., the imaging device 102). FIG. 3 illustrates a schematic including pixels which may be referenced herein in a grid orientation. For example, as referenced herein, a pixel may be referred to by coordinates of rows and columns. For example, FIG. 3 identified the input image 300 by rows 312-1, . . . , 312-N and columns 316 may be identified by alphabetic letters A-T. Thus, a pixel may be referred to herein by a coordinate of e.g., row 312-3 and column A denotes a pixel with the number 21, thus may be referred to herein as pixel 21, etc. As illustrated by FIG. 3, a pixel location that is absent a number represents an unprocessed pixel location e.g., Row 312-6 and column B is absent a number and is thus an unprocessed pixel location and may be referred to herein as the unprocessed pixel location at row 312-6 and column B, etc.

As illustrated by FIG. 3, a first band 314-1 and a second band 314-N including rows of pixels are identified. For example, the first band 314-1 may include rows 312-1, 312-2, 312-3, and 312-4 of pixels. The second band 314-N may include rows 312-5, 312-6, 312-7, and 312-N. Thus, the quantity of rows of the first band 314-1 and the quantity of the second band 314-N are four, and thus equal. As mentioned, a controller (e.g., the controller 108) may set a delay in the pixel processing order such that the rows of each band may be processed in parallel raster order. For example, the controller may set a predetermined delay of six pixels to be processed from a first row 312-1 of the first band 314-1 in advance of beginning processing on a second row 312-2 of the first band 314-1. The predetermined delay may apply to the second row 312-2 in advance of beginning processing on the third row 312-3, etc.

As mentioned herein, the controller may determine the contone value of an input pixel and determine error diffusion locations (e.g., unprocessed pixel locations) based on the contone value of the input pixel. FIG. 3 illustrates the input pixel at a first discrete time of the parallel image processes of the input image 300-1 by a dot located at row 312-4 and column K. The controller may compare the contone value of the input pixel to a look-up table stored in the imaging device (e.g., the image device 102) to determine the locations for the error diffusion. The error of the input pixel (located at row 312-4 and column K) may be diffused to a plurality of unprocessed pixel locations that are an immediate neighbor, and/or adjacent to an immediate neighbor of the input pixel.

For example, the look-up table (e.g., Table 1 mentioned above) may indicate that the input pixel has a contone value of 0 which corresponds to weights W1, W2, W3, W4 and that the unprocessed pixel locations to which the error (e.g., the weights W1, W2, W3, W4) of the input pixel is to be diffused are denoted as W1, W2, W3, and W4. In this instance the locations where the error is diffused to, may be an immediate neighbor to the input pixel as well as other unprocessed pixel locations. For example, the immediate neighbors of the input pixel are the processed pixels 49, 52, 55, and 66, and unprocessed pixel locations at row 312-4 column L, row 312-4 column, row 312-5 column J, row 312-5 column K, and 312-5 column L. Thus, the contone value of the input pixel may correspond to error locations that are adjacent to the immediate neighbors and/or an immediate neighbor.

As illustrated in FIG. 3, at the input pixel may include a contone value, the error of which may be diffused to the locations indicated by W1 at row 312-4 and column L, W2 at row 312-5 and column K, W3 at row 312-5 and column H, and W4 at row 312-5 and column F. In the first instance input image 300-1 the error W1 . . . , W4 may be utilized by TDFED to update the contone value at the corresponding unprocessed pixel locations. Specifically, the error W1 at the unprocessed pixel location row 312-4 column L may be used to update the contone value of the pixel to be processed at that location. Utilizing a look-up table to diffuse error of an input pixel to predetermined locations corresponding to the contone value of the input pixel may provide a quality halftone image while increasing throughput via the parallel image processes. After the input pixel at row 312-4 and column K is completed, the parallel processing may continue are described in connection with FIG. 2. As the parallel processing progresses, the first band 314-1 may be completed and the second band 314-N may begin its parallel processes as illustrated by the second discrete time of the input image 300-2.

For example, as indicated by the arrow 318, the second band 314-N may begin processing at pixel 81 in a parallel serpentine order. Specifically, the rows 312-5, . . . , 312-N may be processed in parallel raster order from right to left which is serpentine with respect to the first band 314-1. Since the controller may determine a delay for the pixel processing of the first band 314-1 and the second band 314-N (a predetermined delay of six pixels), the second band 314-N may proceed with parallel image processes in the same manner as the first band 314-1. For example, the input image 300 at the second discrete time 300-2 may include an input pixel denoted in FIG. 3 by the dot located at row 312-6 and column S. The second band 314-N may process each pixel similarly to the first band 314-1. For example, the diffused error of each pixel being processed in the second band 314-N is diffused to multiple unprocessed pixel locations (denoted by W5, W6, W7, and W8) based on the contone value (e.g., contone value of 1) of the pixel being processed (at row 312-6 and column S).

Parallel image processes as described herein and illustrated by FIG. 3 show a four-row serpentine scan path utilizing TDFED. An imaging device may store a look-up table including contone values which may correspond to error diffusion locations and weights. As a four-row scan path progresses as illustrated by the input image at the first instance 300-1 and the second instance 300-2, error is diffused to multiple locations. The unprocessed pixel at each of the diffused locations may update their respective contone values such that TDFED in combination with the parallel image processes may produce quality halftone images at an increased throughput.

Figure 4:
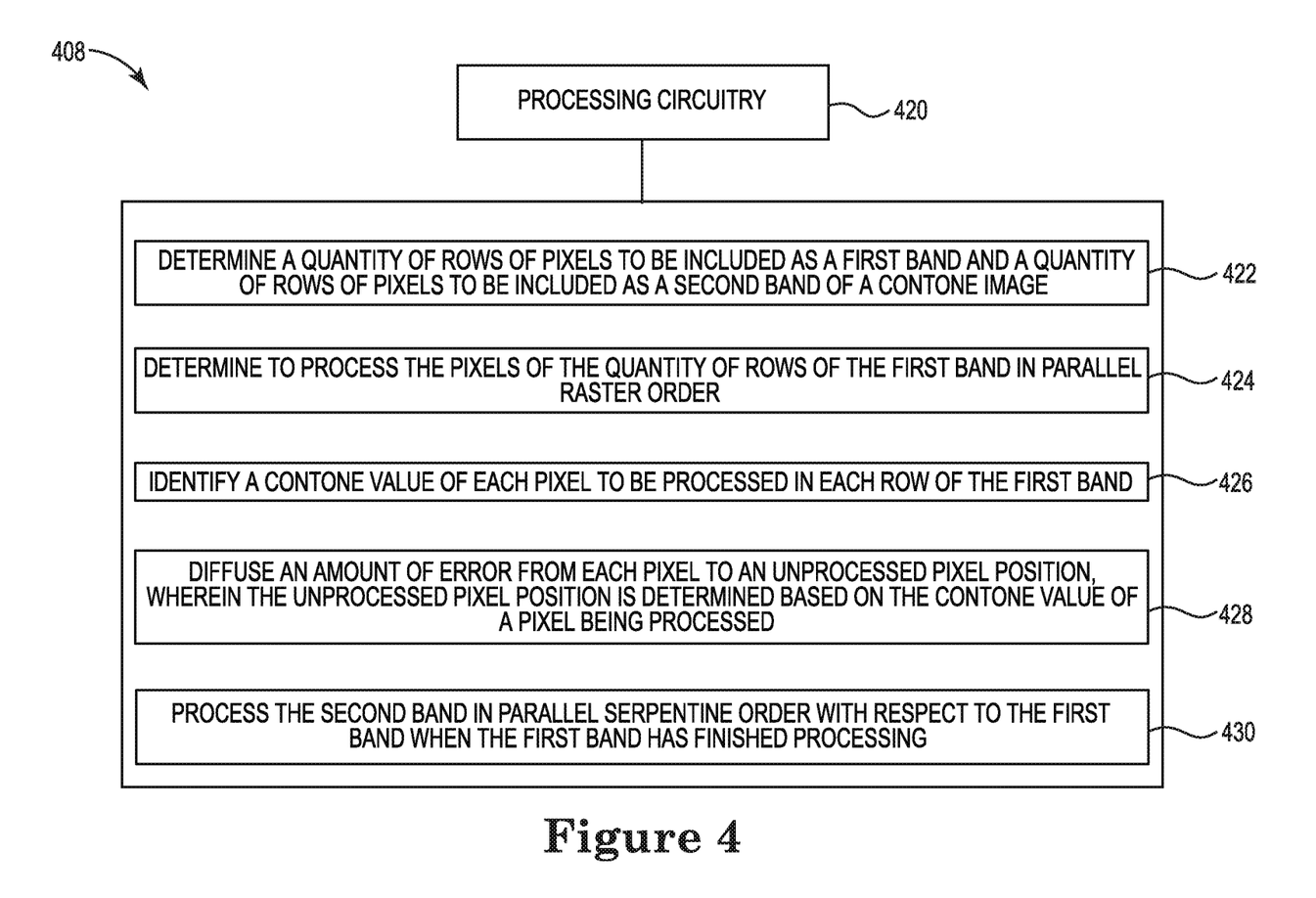
FIG. 4 is a block diagram of a controller including processing circuitry suitable for parallel image processes according to an example.

FIG. 4 is a block diagram of a controller 408 including processing circuitry 420 suitable for parallel image processes according to an example. Controller 408 may include a processing resource and a machine-readable storage medium. Processing circuitry 420 may be a central processing unit (CPU), microprocessor, and/or other hardware device suitable for retrieval and execution of instructions stored in machine-readable storage medium. In the particular example shown in FIG. 4, processing circuitry 420 may include an electronic circuit (e.g., FPGA and/or ASIC) comprising an electronic component for performing the operations 422, 424, 426, 428, and 430. With respect to the operation representations or boxes described and shown herein, it should be understood that part or all of the operations/executable instructions and/or electronic circuits included within one box may be included in a different box shown in the figures or in a different box not shown.

Operations 422, when executed by the processing circuitry 420, may cause the controller 408 to determine a quantity of rows (e.g., 4 rows) of pixels to be included as a first band (e.g., the first band 214-1) and a quantity of rows (e.g., 4 rows) of pixels to be included as a second band (e.g., the second band 214-N) of a contone image (e.g., the input image 200). For example, the controller 408 may determine to apply a four-row serpentine scan path to the input image and partition the rows of pixels into a plurality of bands where the rows of each band may be processed in parallel.

Operations 424, when executed by the processing circuitry 420, may cause the controller 408 to determine to process the pixels of the quantity of rows of the first band in parallel raster order. For example, the controller 420 may set a predetermined delay of six pixels and process the first row (e.g., 212-1) from left to right for the first 7 pixels. In this example, the 8$^{th}$ pixel may begin a second row such that the first row and the second row may be processed concurrently. Specifically, the controller may apply TDFED to the input image to process each pixel.

In some examples, the controller 408 may apply a different weight to each row of the first band and the second band. For example, the controller may determine the contone values of each pixel of the input image and apply a weight for each row to generate a quality halftone image. In some examples, the weight applied to each row may be a set of weights. For instance, the controller 408 may determine the weights from a look-up table stored on the imaging device (e.g., the imaging device 102).

Operation 426 when executed by the processing circuitry 420, may cause the controller 408 to identify a contone value of each pixel to be processed in each row of the first band. For example, as the controller 408 processes each input pixel, the controller 408 may determine a contone value of the input pixel to determine where the error from TDFED may be diffused. The controller 408 may determine the locations from a look-up table (e.g., table 1).

Operation 428 when executed by the processing circuitry 420, may cause the controller 408 to diffuse an amount of error from each pixel to an unprocessed pixel location, where the unprocessed pixel location is determined based on the contone value of a pixel being processed. For example, the look-up table may identify multiple error diffusion destinations based on the contone value of the input pixel (e.g., W1, W2, W3, and W4 of FIG. 3).

Operation 430 when executed by the processing circuitry 420, may cause the controller 408 to process the second band in parallel serpentine (e.g., arrow 218 of FIG. 2) order with respect to the first band when the first band has finished processing. For example, the controller 408 may process each row of the first band concurrently with a six pixel delay as set by the controller. When the last pixel of the first band has finished processing the second band may begin processing each pixel. Specifically, the second band may process each of its rows in parallel (concurrently) with a six pixel delay. Notably, to increase the throughput of the processing of the pixels, the second band is processed in serpentine order when compared to the first band.

Figure 5:
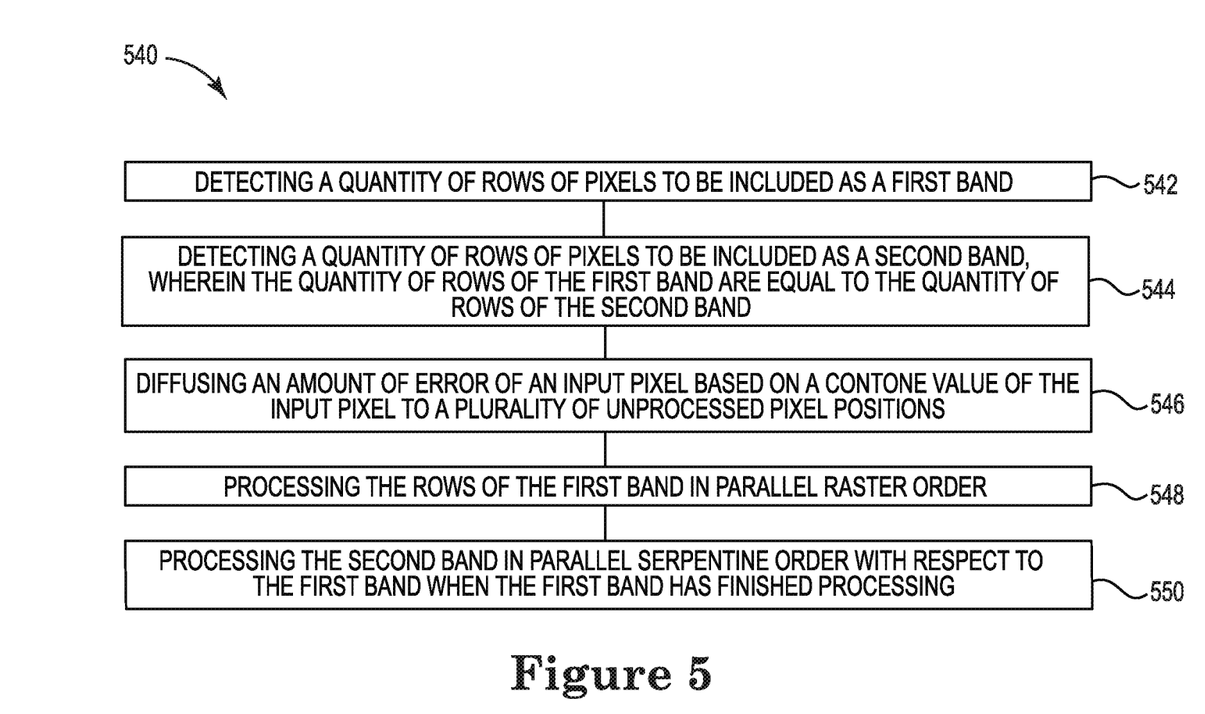
FIG. 5 is a method for parallel image processes according to an example.

FIG. 5 is a method 540 for parallel image processes according to an example. At 542, detecting, by a controller (e.g., the controller 108) a quantity of rows (e.g., 4 rows) of pixels to be included as a first band (e.g., the first band 214-1). In some examples, the controller may partition the input image into multiple bands having an equal quantity of rows.

For example, at 544 the method can include detecting, by a controller, a quantity of rows of pixels to be included as a second band, where the quantity of rows of the first band are equal to the quantity of rows of the second band. In this example, the controller determines that the second band (e.g., the second band 214-N) includes four rows of pixels to be processed. The controller may determine a contone value for each pixel to process using TDFED.

For example, at 546 the method can include diffusing, via the controller, an amount of error of an input pixel based on a contone value of the input pixel to a plurality of unprocessed pixel locations. For example, the controller may process each input pixel, to determine a contone value of the input pixel to determine where the error from TDFED may be diffused. The controller 408 may determine the locations from a look-up table (e.g., table 1). For example, the look-up table may identify multiple error diffusion destinations based on the contone value of the input pixel (e.g., W1, W2, W3, and W4 of FIG. 3). In other words, locations of the unprocessed pixel locations are selected based on the contone value of the input pixel to be processed. The error locations are stored in a look-up table corresponding to the contone values of the pixels to be processed. The controller may proceed in this manner until the first band has completed the processing of all of the pixels of its four rows.

For example, at 548 the method can include processing, via the controller, the rows of the first band in parallel raster order until all of the pixels of each of the four rows of the first band are processed. For example, the controller 420 may set a predetermined delay of six pixels and process the first row (e.g., 212-1) from left to right for the first 7 pixels. In this example, the 8$^{th}$ pixel may begin a second row such that the first row and the second row may be processed concurrently. Specifically, the controller may apply TDFED to the input image to process each pixel of the first band in advance of processing the second band.

For example, at 550 the method can include processing, by the controller, the second band in parallel serpentine order with respect to the first band when the first band has finished processing. For example, the controller may process each row of the first band concurrently with a six pixel delay as set by the controller. When the last pixel of the first band has finished processing the second band may begin processing each pixel. Specifically, the second band may process each of its rows in parallel (concurrently) with a six pixel delay. Notably, to increase the throughput of the processing of the pixels, the second band is processed in serpentine order when compared to the first band.

In the foregoing detailed description of the disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the disclosure.

As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Similar elements or components between different figures can be identified by the use of similar digits. For example, 221 can reference element "21" in FIG. 2, and a similar element can be referenced as 321 in FIG. 3. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense.

What is claimed:

1. An imaging device, comprising:
   a controller including processing circuitry, the controller to:
   detect a first quantity of rows of pixels to be included as a first band of a contone image;
   process the pixels of each row of the first band in parallel raster order;
   detect a second quantity of rows of pixels to be included as a second band of the contone image; and
   process the pixels of each row of the second band in response to the completion of the pixels of the first band, wherein the rows of the second band are processed in parallel in serpentine order with respect to the first band.

2. The imaging device of claim 1, wherein the controller is further to:
   identify a contone value of an input pixel to be processed in a first row of the first band; and
   diffuse an amount of error of the input pixel to a plurality of unprocessed pixel locations, wherein each unprocessed pixel location is determined based on the contone value of the input pixel being processed.

3. The imaging device of claim 2, wherein the plurality unprocessed pixel locations are adjacent to an immediate neighbor of the input pixel.

4. The imaging device of claim 1, wherein the controller sets a predetermined delay of six pixels to be processed from a first row of the first band in advance of beginning processing on a second row of the first band.

5. The imaging device of claim 1, wherein the controller is further to:
   determine a processing order of the pixels in the second band; and
   process the pixels in the second band in a serpentine order to the first band.

6. The imaging device of claim 1, where in the quantity of the rows of the first band and a quantity of rows in the second band are equal.

7. The imaging device of claim 1, wherein the quantity of rows of the first band and the second band is four or more.

8. A controller, comprising:
   processing circuitry to:
   determine a quantity of rows of pixels to be included as a first band and a quantity of rows of pixels to be included as a second band of a contone image;
   determine to process the pixels of the quantity of rows of the first band in parallel raster order;
   identify a contone value of each pixel to be processed in each row of the first band;
   diffuse an amount of error from each pixel to an unprocessed pixel location, wherein the unprocessed pixel location is determined based on the contone value of a pixel being processed; and
   process the second band in parallel serpentine order with respect to the first band when the first band has finished processing.

9. The controller of claim 8, wherein the quantity of rows in the first band and the quantity of rows in the second band are four.

10. The controller of claim 8, wherein the controller applies a different weight to each row of the first band and the second band.

11. The controller of claim 8, wherein the controller determines a delay for the pixel processing of the first band and the second band.

12. The controller of claim 8, wherein the diffused error of each pixel being processed is diffused to multiple unprocessed pixel locations based on the contone value of the pixel being processed.

13. A method, comprising:
   detecting a quantity of rows of pixels to be included as a first band;
   detecting a quantity of rows of pixels to be included as a second band, wherein the quantity of rows of the first band are equal to the quantity of rows of the second band;
   diffusing an amount of error of an input pixel based on a contone value of the input pixel to a plurality of unprocessed pixel locations;
   processing the rows of the first band in parallel raster order; and
   processing the second band in parallel serpentine order with respect to the first band when the first band has finished processing.

14. The method of claim 13, wherein the unprocessed pixel locations stored in a look up table and are selected based on the contone values of the input pixel.

15. The method of claim 13, wherein the contone value of the input pixel corresponds to a plurality of weights indicating the proportion of error that is to be diffused to the unprocessed pixel locations.

* * * * *